United States Patent Office.

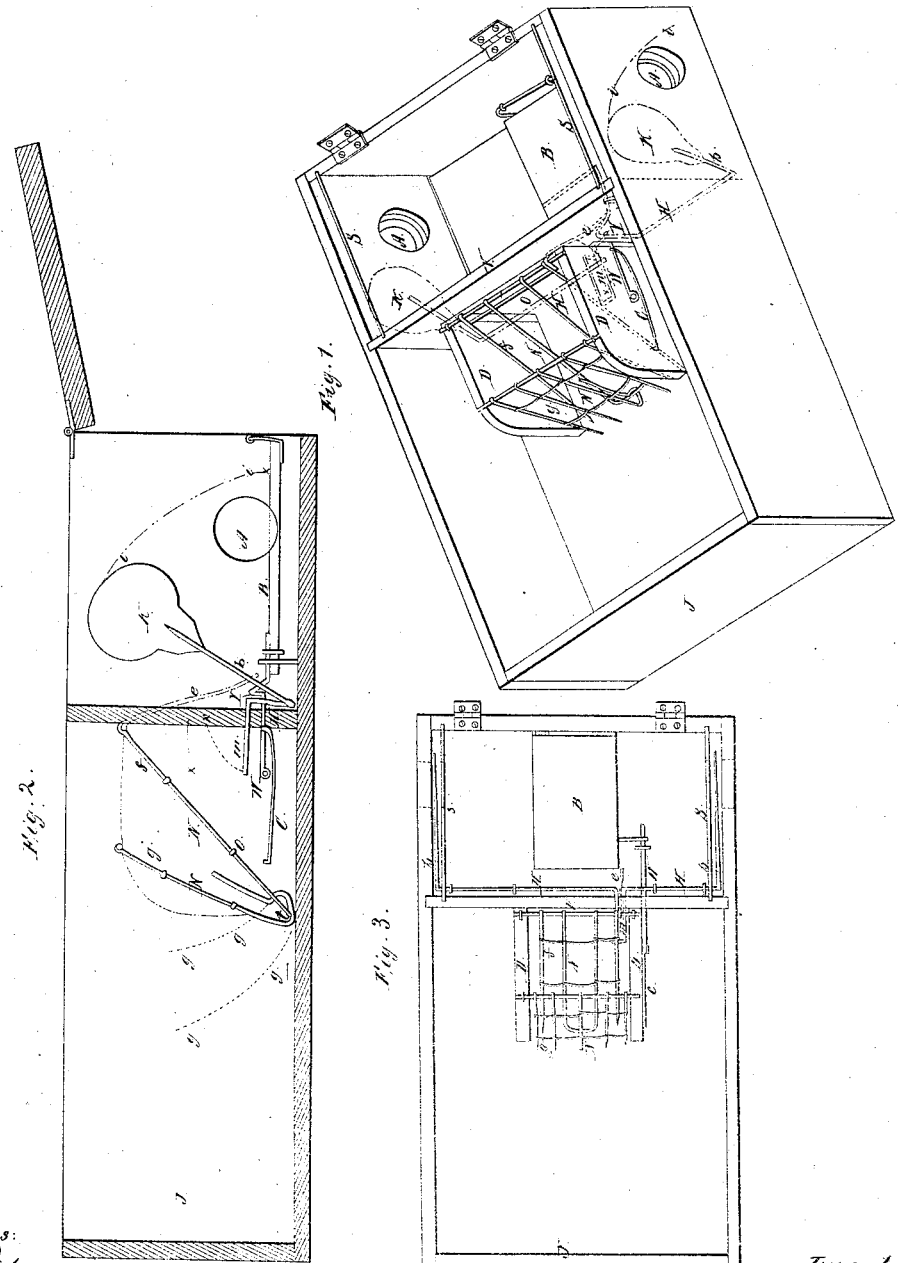

IMPROVEMENT IN ANIMAL TRAPS.

SAMUEL F. ESTELL, OF RICHMOND, INDIANA.

Letters Patent No. 59,762, dated November 20, 1866.

SPECIFICATION.

TO ALL WHOM IT MAY CONCERN:

Be it known that I, SAMUEL F. ESTELL, of Richmond, in the county of Wayne, State of Indiana, have invented new and useful Improvements in Animal Traps, and do hereby declare the following to be a full and exact description of the same, reference being had to the accompanying drawings and to the letters of reference marked thereon.

The nature of my invention consists in so arranging the trap as to permanently secure the animal after it is caught, and to simplify and cheapen the construction of self-setting traps, at the same time insuring promptness in its operation.

To enable others skilled in the art to make and use my invention, I will proceed to describe its construction and operation.

Fig. 1 is a perspective view, showing the interior of the trap.

Fig. 2 is a sectional view, showing the operation of the moveable parts.

Fig. 3 is a perpendicular view, showing the interior of the trap.

Similar letters of reference, when they occur in different figures, represent corresponding parts of the trap in all the drawings. J, fig. 1, is a box divided by the partition V into two apartments, A A are openings for the entrance of the animals; K, fig. 2, shows one of the doors in position when the trap is set; K K, fig. 1, shows the motion of the doors by dotted lines $i i$; the doors are fastened to the arms $b b$, which arms are connected with the shaft H H; the shaft, arms, and crank $m$, all being made of one single piece of wire; N N is a double rack, the top of each section of which is pivoted separately on the bearings D D, and connected at their terminations by a hook $t$, formed by a bend in a rod of the upper section $g$, and by joining two rods of the under section $f$ at their lower ends and locking into the hook $t$, the power when applied to the under section $f$ lifts the joined rods out of the hook $t$ permitting the rack to be raised, as shown by dotted lines $j j$, for the passage of the animal into the second apartment through the opening O in the partition V; this arrangement prevents the rack from being raised by applying power to the upper section $g$, as the hook $t$ is then operative, thus preventing the animal from escaping as in the case of a single rack; the doors K K are operated by a bend in the shaft H H, forming a crank $m$, the crank being acted upon by the lever $e$, which lever is rigidly attached to section $f$ of the rack N N and is moved by it, thus causing the doors in their operation to describe the arc of a circle as shown by dotted lines $i i$; the doors are suspended by the trigger W, being forced upwards by the action of spring C, the trigger being provided with a notch at $y$ catching the crank $m$. B represents a hinged platform connected with the trigger W, the animal by pressing on the platform and depressing the trigger releases the crank $m$, permitting the doors to fall and cover the openings A A, which are again raised by the passage of the animal under the rack into the second apartment, leaving the trap ready for the entrance of another animal.

S S are panels provided with openings at A A, between which panels and the outer walls of the trap is sufficient room for the action of the doors, as shown in fig. 3, serving to conceal the action of the doors and to prevent their being raised by the animal for the purpose of egress.

The whole as shown, when covered by a lid, forms a self-setting animal trap with my improvements attached. Having thus fully described my invention, I will proceed to set forth what I claim and desire to secure by Letters Patent:

1st. I claim the double rack N N, constructed and operating substantially as set forth, and for the purposes described.

2d. I claim the shaft H H, the crank $m$, and arms $b b$, all made of one single piece of wire, when operating substantially in the manner and for the purposes described.

3d. I claim the rack N N, shaft H H, crank $m$, arms $b b$, doors K K, and panels S S in combination, the box J, the openings A A, and platform B, all arranged substantially as set forth and for the purposes described.

SAM'L F. ESTELL.

Witnesses:
JOHN H. POPP,
JOSEPH RIDGE.